United States Patent [19]

Motomura et al.

[11] Patent Number: 4,626,562
[45] Date of Patent: Dec. 2, 1986

[54] EPOXY RESIN COMPOSITION AND CONSTRUCTION MATERIAL CONTAINING THE SAME FOR USE IN NEW CONSTRUCTION OR FOR REPAIRS

[75] Inventors: Masatoshi Motomura; Niichi Toyama, both of Ichihara; Noboru Okoshi, Chiba; Yoshitami Araki, Kisai; Kenichiro Nomura, Satte; Takehisa Kozai, Kodaira, all of Japan

[73] Assignees: Dainippon Ink & Chemicals, Inc.; Taisei Road Construction Co., Ltd., both of Tokyo, Japan

[21] Appl. No.: 742,456

[22] Filed: Jun. 7, 1985

[30] Foreign Application Priority Data

Jan. 28, 1985 [JP] Japan .................................. 60-12492

[51] Int. Cl.⁴ ....................... C08L 63/00; C08G 59/66
[52] U.S. Cl. ...................................... 523/466; 528/93; 528/109; 528/360
[58] Field of Search .................. 525/505; 523/466; 528/93, 109, 361, 365, 360

[56] References Cited

U.S. PATENT DOCUMENTS

| | | | |
|---|---|---|---|
| 3,533,283 | 1/1971 | Doss | 528/109 X |
| 3,732,309 | 5/1973 | Garnish et al. | 528/109 X |
| 3,746,685 | 7/1973 | Dobinson et al. | 528/109 |
| 3,916,067 | 10/1975 | Jones et al. | 528/109 X |
| 4,153,586 | 5/1979 | Hockswender et al. | 528/109 X |

FOREIGN PATENT DOCUMENTS 56-90828  7/1981  Japan .
60-90217  5/1985  Japan .

*Primary Examiner*—Earl Nielsen
*Attorney, Agent, or Firm*—Sherman and Shalloway

[57] ABSTRACT

An epoxy resin composition is provided consisting essentially of (a) an epoxy compound having at least two epoxy groups in each of its molecules, (b) an ester of a mercaptoalkylcarboxylic acid having on an average more than two thiol groups in each of its molecules and in which the number of carbon atoms of the alkylene groups between the ester groups and the thiol groups is in excess of one on an average, and (c) a tertiary amine-type curing accelerator.

This resin composition is used for new construction or repairs either as such or in the form of a construction material obtained by mixing this composition with aggregates and optionally with additives.

16 Claims, No Drawings

EPOXY RESIN COMPOSITION AND CONSTRUCTION MATERIAL CONTAINING THE SAME FOR USE IN NEW CONSTRUCTION OR FOR REPAIRS

This invention relates to an epoxy resin composition that is useful in new constructions as well as for repairs in which asphalt concrete or cement concrete is or has been employed. It also pertains to a construction material comprised of the resin composition.

In the past, the patching method has been widely employed in dealing with temporary repairs of damages of asphalt concrete and cement concrete structures. According to this method, there is employed either a temporary method in which the portion to be repaired is directly filled or covered with asphalt concrete or cement concrete, or a method in which the portion needing repair is removed and a surface course is laid with new materials.

The former method of repair is employed in emergency cases, and in general a hot or cold asphalt mixture is used. The hot asphalt mixture demonstrates good adhesion to existing asphalt pavements, and possesses superior durability and stability. However, when the atmospheric temperature is low, there is the drawback that the work must be started after providing means for preventing cooling of the mixture, with the consequence that considerable difficulty is experienced in dealing with this problem. On the other hand, in the case of the cold asphalt mixture, its stability and durability are not satisfactory. Especially, at low temperatures the workability decreases and, in addition, there is the drawback that there is a marked deterioration in the strength of the repaired portion.

Thus, during the winter season when the atmospheric temperature is low, i.e., in the neighborhood of 0° C., the use of both the hot asphalt mixture and the cold asphalt mixture cannot be justified.

As a substitute for these asphalt mixtures, there is now being suggested a composition consisting of an epoxy resin and a polythiol. Since such a composition has a rapid curing property, it has the advantage of demonstrating stability and durability in the early stages when the construction work is carried out using the cold mixing method. However, in this composition the content of the aggregates such as sand and gravel is small, while the content of the resinous portion is large. Hence, the mixture becomes costly and thus it has not gained practical acceptance as a material for use in repairing damaged asphalt concrete and cement concrete surfaces. If the content of the resinous portion is reduced to lower the cost of this mixture, this gives rise to another drawback, i.e., the development of the stability and durability in early stages becomes retarded.

The object of the present invention is to provide an epoxy resin composition and construction material for use in new constructions or for repairs, the composition being one that can be easily worked not only at normal temperatures but even at a temperature around 0° C. and provide a structure having stability and durability at least comparable to that obtained using the usual hot asphalt mixture, as well as to make it possible to provide for an early commencement of service with a perfectly completed structure.

The present inventors previously found a resin composition and construction material meeting the aforesaid object, this being achieved by using a thioglycollic acid ester compound having on an average in excess of two thiol groups in each of its molecules as a curing agent for epoxy resin and jointly therewith a tertiary amine compound as a curing accelerator (see Japanese Patent Application No. 198,550/1983). However, when such a mixture of a thioglycollic acid ester compound and a tertiary amine compound is kept in a mixed state, the decomposition of the thioglycollic acid ester compound proceeds, and a decomposition gas consisting predominantly of hydrogen evolves. Thus, when such a mixture is stored for a prolonged period of time in a closed vessel, the pressure inside the vessel rises to an extremely dangerous condition. Hence, in actual practice it is desired for the sake of safety that there be adopted the three component mixing system, which involves mixing the epoxy compound, thioglycollic acid ester and tertiary amine compound immediately prior to the time the mixture is to be applied. However, from the standpoint of workability the three component mixing system is extremely complicated. Thus, the development of a resinous composition that is free from the foregoing shortcoming has been desired even though a two component system is used for mixing.

The present inventors engaged in extensive investigations with the view of finding a compound in which practically no decomposition reaction is set up even when kept stored for a prolonged period of time after having been mixed with a tertiary amine compound used as a curing accelerator. These investigations led to the discovery of a specific ester of mercaptoalkylcarboxylic acid. In addition, it was also found that a resin composition fully satisfying the durability described hereinbefore can be obtained when such a specific compound was used.

There is thus provided in accordance with this invention an epoxy resin composition for use in new constructions or for repairs consisting essentially of (a) an epoxy compound having on an average at least two epoxy groups in each of its molecules, (b) an ester compound of a mercaptoalkylcarboxylic acid having on an average more than two thiol groups in each of its molecules and in which the number of carbon atoms of the alkylene groups between the ester groups and the thiol groups is on an average in excess of one, and (c) a tertiary amine type curing accelerator.

There is also provided according to this invention a construction material for use in new constructions or for repairs that is obtained by mixing the said epoxy resin composition [A] with at least one aggregate [B] and, as required, an additive [C] that reduces the viscosity as well as functions as an extender, the said aggregates being selected from the group consisting of (d) natural or artificial coarse aggregates having particle diameters from 2.5 to 50 mm, (e) natural or artificial fine aggregates having particle diameters of less than 2.5 mm, and (f) fillers.

Any of the commercially available epoxy compounds can be used as the epoxy compound (a) having on an average at least two epoxy groups in each of its molecules. Typical examples include the epoxy resins of the bisphenol A, bisphenol F, hydrogenated bisphenol A, hydrogenated bisphenol F, novolak, polyoxyalkylene, polyhydroxybenzene, methylepichlorohydrin and glycidylamine types; epoxy resins derived from dimeric acid, phthalic acid, tetrahydrophthalic acid or hydroxybenzoic acid and epichlorohydrin; and halogen-containing epoxy resins, etc. Of these epoxy resins, especially preferred are the bisphenol A and novolak type epoxy resins.

As the ester compound (b) of mercaptoalkylcarboxylic acid having on an average more than two thiol groups in each of its molecules and in which the number of carbon atoms of the alkylene group between the ester groups and the thiol groups is on an average in excess of one, any of those that are commercially available can usually be used. Typical examples are thiol compounds obtained by esterification reaction between polyols such as trimethylolpropane, pentaerythritol or dipentaerythritol, and mercaptoalkylcarboxylic acids; and thiol compounds obtained by esterification between compounds having on an average more than two epoxy groups in each of its molecules and mercaptoalkylcarboxylic acids. These may be used either singly or in combination of two or more. Further, these esters of mercaptoalkylcarboxylic acid (b) can also be used conjointly with a thiol compound obtained by esterification between diols such as ethylene glycol, propylene glycol, 1,3-butanediol, 1,4-butanediol or 1,8-octanediols and mercaptoalkylcarboxylic acids.

Especially preferred as the compound (b) is that having on an average in excess of two thiol groups in each of its molecules obtained by esterification between mercaptoalkylcarboxylic acids of the structural formula $$HS-C_nH_{2n}-CO_2H \qquad (I)$$

wherein n is a rational number having on an average a value of $1 < n \leqq 3$, preferably 1.5 to 2.5, and a polyol or polyepoxide. When a mercaptoalkylcarboxylic acid in which n in formula (I) is 1 (i.e., thioglycolic acid) is used, a decomposition gas tends to evolve when being stored after mixing with a tertiary amine-type curing accelerator. On the other hand, when a mercaptoalkylcarboxylic acid in which n is greater than 3 is used, the hardening property at low temperatures is deteriorated. Hence, both cases are not desirable.

Typical examples of the aforesaid polyols are tetraols such as pentaerythritol; triols such as glycerol, trimethylolethane and trimethylolpropane; and diols such as ethylene glycol, diethylene glycol, propylene glycol, dipropylene glycol, 1,3-butanediol, 1,4butanediol, neopentyl glycol, 1,6-hexanediol, 1,8octanediol, etc. On the other hand, polyepoxides are exemplified by various compounds (a) mentioned hereinbefore. These polyols or polyepoxides may be used either singly or in combination of two or more.

Thus, the average number of thiol groups in the compound (b) exceeds 2 but does not exceed 10, and preferably exceeds 2 but does not exceed 6, most preferred being a number ranging between 2.5 and 4.

The tertiary amine-type curing accelerator (c) itself does not participate in the curing reaction but has the function of promoting the curing reaction between the compound (a) and the compound (b). All of the tertiary amines usually used as curing accelerators for epoxy resins can be used as the curing accelerator (c), typical examples being triethanolamine, tetramethylbutanediamine, tetramethylpentanediamine, tetramethylhexanediamine, triethylenediamine or dimethylaniline; hydroxyalkylamines such as dimethylaminoethanol and dimethylaminopentanol; tris(dimethylaminomethyl)-phenol or N-methylmorpholine; and imidazoles such as 2-methylimidazole, 1-benzyl-2-methylimidazole, 2-methyl-4-ethylimidazole, 1-cyanoethyl-2-methylimidazole, 1-cyano-ethyl-2-phenylimidazole and 1-azine-2-methylimidazole. Especially preferred of these is 2,4,6-tris(dimethylaminomethyl)phenol.

The epoxy resin composition of this invention is prepared by mixing the above-described essential components (a), (b) and (c) in a customary manner. In mixing the components (a) and (b) the ratio in which they are mixed should be such that the ratio of the epoxy equivalent weight number of the component (a) compound to the theoretical active hydrogen equivalent weight number of the component (b) compound is preferably in the range from 0.5 to 2, and more preferably in the range from 0.8 to 1.2. The ratio in which the component (c) is mixed is preferably an amount up to 15%, and more preferably from 1 to 10%, based on the total weight of the epoxy resin composition.

On the other hand, the construction material of this invention is obtained by mixing the thus obtained epoxy resin composition [A] with natural or artificial aggregates [B], such as crushed stones, gravel, sand, screenings of various slags, rubber elastomers, various fillers such as calcium carbonate and, as required, additives [C] for adjusting the viscosity of the epoxy compound (a) prior to the curing reaction, for example, "Nisseki Hisol SAS-296" (a liquid high-boiling aromatic hydrocarbon compound produced by Nippon Oil Co., Ltd.). The aggregates [B], may be coarse aggregates (d), fine aggregates (e) and/or fillers (f) suitably chosen and used according to the end use of the construction material. The additives [C] such as "Nisseki Hisol SAS-296", etc. also function as extenders. The additives [C] are especially effective when used at atmospheric temperatures in the neighborhood of 0° C. Hence, in an atmosphere where the temperature exceeds 25° C., they need not be used.

While the amount in which the epoxy resin composition [A] is incorporated into the construction material varies in accordance with the constructing method employed, an amount ranging from about 3 to about 25% by weight is preferable.

The epoxy resin composition and construction material of this invention are used for the construction or repairs of portions of asphalt concrete or cement concrete structures, such as roads for vehicles, pedestrian walks, bridges, parking places, floors, foot paths, etc. of building enclosures.

Especially, when used for new constructions, it is also possible by artificially combining natural aggregates and coloring agents, to build constructions having natural beauty. Again, work can also be carried out on places and portions requiring prevention of dust. Thus, the resin composition and construction material of this invention are extremely useful.

Several preferred embodiments of the present invention will now be described.

(i) The following is a standard recipe preferred for construction materials that are generally used in new constructions and for repairs.

|  | Wt. % |
|---|---|
| Natural or artificial coarse aggregates (d) having a particle diameter of 2.5 to 50 mm | 0 to 99 |
| Natural or artificial fine aggregates (e) having a particle diameter less than 2.5 mm | 0 to 97 |
| Fillers (f) such as calcium carbonate | 0 to 90 |
| Epoxy resin composition [A] | 1 to 50 |
| Additives [C] which reduce the viscosity as well as function as an extender, such as | 0 to 20 |

| | Wt. % |
|---|---|
| "Nisseki Hisol SAS-296" | |

Needless to say, the ingredients (d), (e) and (f) are not all 0 at the same time.

In carrying out the construction or repair works, either the ingredients are all mixed at once immediately prior to the operation (hereinafter called one-pass mixing) or part of the ingredients mixed in advance are mixed immediately prior to the operation with other similarly mixed ingredients (hereinafter called double-pass mixing), following which the thus obtained mixture is packed into the part to be newly constructed or repaired and compacted therein, or there can be employed such methods as that of pouring the mixture or spreading or coating the mixture onto the parts to be constructed or repaired.

(ii) When the method employed is that of filling the place to be newly constructed or repaired in advance with the aggregates [B] followed by pouring a binder into it, a mixture of 0 to 95% by weight of coarse aggregates (d) and 0 to 90% by weight of fine aggregates (e) are first filled in the place. A mixture of 0 to 20% by weight of the filler (f), 5 to 50% by weight of the resin composition [A] and 0 to 20% by weight of the additives [C] mixed as in (i) above, by the one-pass mixing method or the double-pass mixing method is then poured into the voids of aggregates.

(iii) When new constructions or repairs are to be performed as by the macadam road construction method, the place to be constructed is packed in layers with the aggregates proceeding successively from large aggregates to small aggregates, and between the layers there is spread a mixture consisting of 0 to 2% by weight of the filler (f), 1 to 50% by weight of the resin composition [A] and 0 to 2% by weight of the additives [C] that have been mixed as in (i) above, by the one-pass mixing method or the double-pass mixing method. After spreading, the mixture is tamped.

(iv) When new constructions or repairs are to be carried out using only a binder, 50 to 100% by weight of the resin composition [A] and 0 to 50% by weight of the additives [C] are mixed as in (i) above, by the one-pass mixing method or the double-pass mixing method, and the place to be constructed or repaired is either coated with the mixture, or the mixture is packed, spread or poured in.

(v) When new constructions or repairs are to be carried out as by the neat method, 0 to 50% by weight of fine aggregates (e), 0 to 90% by weight of the filler (f), 10 to 100% by weight of the resin composition [A] and 0 to 40% by weight of the additives [C] are mixed as in (i) above, by the one-pass mixing method or the double-pass mixing method, and the place to be constructed or repaired is either coated with the mixture, or the mixture is packed, spread or poured and spread, and at this time, antiskid materials may be embedded in the said road.

It goes without saying that various modifications of the methods described above are possible. Especially, in the case of the method described in (ii), above, a possible modification is that, for example, of packing the place to be constructed or repaired with the aggregates [B] and then pouring a mixture of the resin composition [A] and Nisseki Hisol SAS-296 [C], or the reverse of this procedure is also possible.

As mentioned hereinbefore, even when the ester of a mercaptoalkylcarboxylic acid compound (a) and the tertiary amine-type curing accelerator (c) are mixed in advance and kept stored, hardly any evolution of a decomposition gas is noted. Thus, in accordance with this invention, the epoxy compound (a) needs only to be mixed at the construction site with a previously mixed mixture of the compound (b) and the curing accelerator (c) (the curing agent components). Hence, the operation of forming the composition is very easy.

Furthermore, since this resin composition possesses a rapid curing property even at an atmospheric temperature in the neighborhood of 0° C., it can be satisfactorily worked at below the freezing point. In addition, it cures to form a three-dimensional network. It can therefore be said to be an unprecedented resin composition.

Again, since the epoxy resin composition of this invention contains neither the primary amine-type compound nor the secondary amine-type compound but contains only the aforementioned tertiary amine-type compound as the tertiary amine-type curing accelerator (c), it is characterized in that its pot life can be freely adjusted by changing the amount of the curing accelerator (c) added.

The following referential, working and comparative examples will serve to illustrate the present invention more specifically. Unless otherwise indicated, the parts and percentages used in the examples are all on a weight basis.

REFERENTIAL EXAMPLE 1

Preparation of the compound (b)

A 1-liter 4-necked round bottom flask was charged with 527 g of mercaptopropionic acid and 173 g of trimethylolpropane. The temperature was raised to 170° C. with stirring, and the reaction was carried out until no further distillation of condensed water occurred. Trifunctional trimethylolpropane-mercaptopropionic acid ester as a transparent liquid was obtained. This is designated hereinafter as compound (b-1).

REFERENTIAL EXAMPLE 2

(ditto)

Referential Example 1 was repeated but using 278 g of mercaptopropionic acid, 241 g of thioglycollic acid and 182 g of trimethylolpropane to give trimethylolpropane-mercaptopropionic acid-thioglycollic acid ester as a transparent liquid having three functional bases on an average. This is designated hereinafter as compound (b-2).

REFERENTIAL EXAMPLE 3

(ditto)

Referential Example 1 was repeated but using 433 g of mercaptopropionic acid, 15 g of pentaerythritol and 108 g of ethylene glycol to give pentaerythritolethylene glycol-mercaptopropionic acid ester as a transparent liquid having 3.5 functional bases on an average. This is designated hereinafter as compound (b-3).

REFERENTIAL EXAMPLE 4

(ditto)

Referential Example 1 was repeated but using 278 g of mercaptopropionic acid, 250 g of thioglycollic acid, 181 g of trimethylolpropane and 133 g of propylene glycol to give trimethylolpropane-propylene glycol-mercaptopropionic acid-thioglycollic acid ester as a transparent liquid having 2.5 functional bases on an average. This is designated hereinafter as compound (b-4).

REFERENTIAL EXAMPLE 5

(ditto)

Referential Example 1 was repeated but using 471 g of thioglycollic acid and 276 g of trimethlolpropane to give trifunctional trimethylolpropane-thioglycollic acid ester as a transparent liquid. This is designated hereinafter as compound (b-5). EXAMPLES 1 TO 5 AND COMPARATIVE EXAMPLE 1

In each of the runs, natural coarse aggregates having a particle diameter of 5 to 2.5 mm and fine aggregates having a particle diameter of less than 2.5 mm were mixed in advance at a weight ratio of 7:3. 92.5% of this mixture was mixed with 7.5% of a binder consisting of the liquids 1 and 2 shown in Table 1 combined in the proportions indicated therein, to obtain a construction material. Further, the storage stability of the liquid 2 was tested by placing this liquid in a closed vessel and allowing it to stand at 50° C. for two months. The results obtained in this test are shown together in Table 1.

The pot life of each of the thus obtained construction materials was then measured. They were also subjected to Marshall stability test and ravelling test. Specimens for these latter tests were prepared 15 minutes after prepartion of the construction material, and the tests were conducted 15 hours later. The results obtained are shown in Table 2.

TABLE 1

|  |  | Examples | | | | | Comparative Example 1 |
| --- | --- | --- | --- | --- | --- | --- | --- |
|  |  | 1 | 2 | 3 | 4 | 5 | |
| Liquid 1 | Epiclon 855* | 56.3 | 56.3 | 65.9 | 70.5 | 51.6 | 56.3 |
|  | Nisseki Hisol SAS-926 | 6.2 | 6.2 | 7.2 | 7.7 | 13.6 | 6.2 |
| Liquid 2 | Compound (b-1) | 30.8 |  |  |  | 28.1 |  |
|  | Compound (b-2) |  | 30.8 |  |  |  |  |
|  | Compound (b-3) |  |  | 20.0 |  |  |  |
|  | Compound (b-4) |  |  |  | 14.8 |  |  |
|  | Compound (b-5) |  |  |  |  |  | 34.1 |
|  | 2,4,6-tris(dimethylaminomethyl)phenol | 6.7 | 6.7 | 6.9 | 7.0 | 6.7 | 3.4 |
| Storage stability of liquid 2 (a period of 2 months at 50° C.) | | | | Good | | | Marked evolution of decomposition gas |

*Bisphenol A-type epoxy resin containing a diluent, a product of Dainippon Ink & Chemicals, Inc.

TABLE 2

|  | Examples | | | | | Comparative Example 1 |
| --- | --- | --- | --- | --- | --- | --- |
|  | 1 | 2 | 3 | 4 | 5 | |
| Pot life (min) | 30 | 35 | 35 | 40 | 45 | 30 |
| Marshall stability (kg)* | 2,800 | 2,500 | 2,080 | 2,450 | 1,430 | 2,760 |
| Flow value (1/100 cm) | 55 | 51 | 50 | 50 | 48 | 25 |
| Ravelling test (cm²)** | 0.52 | 0.61 | 0.78 | 0.75 | 0.94 | 0.55 |

*In accordance with ASTM D 1559
**In accordance with "Manual for Design and Construction of Asphalt Pavement" by the Japan Road Association and when a cross chain has been used. Test temperature of 0° C. was employed.

Further, repair work on a national highway in the snowy and cold area, using the binder of Example 1, the recipe (aggregate mixture, amount of binder and mixing method) and the working procedure shown in Table 3 was carried out during the thawing season (early to mid-March; temperature at the place where work carried out 3.5° to 6° C.).

TABLE 3

| Aggregate Mixture | Amount of Binder | Mixing Method | Working Procedure |
| --- | --- | --- | --- |
| For snowy area use |  | In-situ hand mixing | 1 Applying a tack coat to the place to be repaired |
| Coarse aggregates |  |  |  |
| Fine aggregates 70 | 7.5% | Mixing time was 3 min. | 2 Preparation of mixture |
| 30 (Weight ratio) |  |  | 3 Patching the place to be repaired |
|  |  |  | 4 Profiling by tamping |

The road was opened to traffic about 30 minutes after the profiling was completed by tamping of 4 above.

In this test the place where the repair was made was a national highway of heavy traffic. Moreover, since it was during the thawing season, the number of vehicles using chains and spike tires was large. The material used for repairing was hence subjected to harsh conditions. Despite this fact, the rate of attrition was extremely small even after the road had been used for four months. It was thus demonstrated that the construction material of this invention is extremely suitable for use as a temporary repairing material in snowy and cold areas.

EXAMPLE 6

A mold for making Marshall test specimens was packed at 0° C. with natural coarse aggregates having a particle diameter of 13 to 5 mm. The binder of Example 1 was then filled to the upper surface of the aggregates, and 1.5 hours later the Marshall stability test was conducted. The results of the test showed a stability of above 5000 kg.

EXAMPLE 7

A part of a step of a concrete staircase was coated at a temperature of about 10° C. with a mixture of 100 parts of the binder of Example 1 and 100 parts of natural sand having a particle diameter of less than 2.5 mm to a thickness of 2 to 3 mm. Over this was then spread nickel slag having a particle diameter of 5 to 2.5 mm followed by tamping. In this case it was possible for a person to use the stairs within 15 minutes after completion of the work. Moreover, excellent antiskid effects were demonstrated.

EXAMPLE 8

An epoxy resin composition was obtained by mixing 92 parts of "Epiclon 855", 8 parts of "Nisseki Hisol SAS-296", 55 parts of the compound (b-1) obtained in Referential Example 1 and 5.4 parts of 2,4,6-tris-(dimethylaminomethyl)phenol.

This composition had a Brookfield viscosity at 0° C. of 7500 centipoises, but it started to thicken, about 10 minutes after its mixing, and hardened about 15 to 30 minutes after its mixing.

EXAMPLE 9

A pothole (the length of major axis was about 50 cm, the length of minor axis was about 15 cm, depth was 5 cm) of a road over which heavy vehicles equipped with crawlers pass over was filled at a temperature of about 20° C. with a mixture of 75 parts of natural sand having a particle diameter of less than 2.5 mm and 25 parts of the binder of Example 1, and the road was opened to traffic about 20 minutes later. Attrition and scattering of the material used in repairs by the claws of the crawler were not noted.

EXAMPLE 10

At a temperature of about 5° C., a pothole (the length of major axis was about 20 cm, the length of minor axis was about 10 cm, depth was 3 cm) of a waterpermeable sidewalk was filled with a mixture of 97 parts of natural aggregates having a particle diameter of 13 to 5 mm and 3 parts of the binder of Example 1, after which the filled portion was compacted by tamping. About 25 minutes later, the side walk was opened to human walking. No attrition or scattering of the material used in repair were noted.

As apparent from the foregoing experiments, the epoxy resin composition of this invention is very easy to handle, and hence it is very easily worked. Since it can be cured rapidly at atmospheric temperatures in the neighborhood of 0° C., the composition of this invention makes it possible to carry out construction and repair works even below the freezing point. Again, the pot life can be optionally adjusted by changing the amount of the curing accelerator (c) to be added.

In addition, the cured product obtained by the use of the composition of this invention possesses superior durability, i.e., it usually has a higher stability than compacted conventional hot asphalt mixtures.

It goes without saying that these various merits of the composition of this invention are manifested directly as well as in the form of the construction material of this invention.

What is claimed is:

1. A construction material for use in new constructions or for repairs comprising
   [A] an epoxy resin composition consisting essentially of (a) an epoxy compound having on an average at least two epoxy groups in each of its molecules, (b) an ester of a mercaptoalkylcarboxylic acid having on an average more than two thiol groups in each of its molecules and in which the number of carbon atoms of the alkylene group between the ester groups and the thiol groups is on an average in excess of one, and (c) a tertiary amine-type curing accelerator;
   [B] at least one aggregate selected from the group consisting of (d) natural and artificial coarse aggregates having a particle diameter of 2.5 to 50 millimeters, and (e) natural and artificial fine aggregates having a particle diameter of less than 2.5 millimeters, and, as required,
   [C] an additive that reduces the viscosity as well as functions as an extender.

2. A construction material according to claim 1 wherein the said epoxy compound (a) is a bisphenol A-type epoxy resin.

3. A construction material according to claim 1 wherein the said epoxy compound (a) is a novolak-type epoxy resin.

4. A construction material according to claim 1 wherein the said mercaptoalkylcarboxylic acid ester compound (b) is a thiol compound obtained by esterification between polyol and mercaptoalkylcarboxylic acid.

5. A construction material according to claim 1 wherein the said mercaptoalkylcarboxylic acid ester compound (b) is a compound obtained by esterification between a compound having on an average in excess of two epoxy groups in each of its molecules and a mercaptoalkylcarboxylic acid.

6. A construction material according to claim 1 wherein the said mercaptoalkylcarboxylic acid ester compound (b) is a thiol compound obtained by esterification between a compound having on an average more than two epoxy groups in each of its molecules and mercaptoalkylcarboxylic acid of the general formula $$HS-C_nH_{2n}-CO_2H \qquad [I]$$

wherein n is a rational number having on an average a value of $1 < n \leq 3$.

7. A construction material according to claim 6 wherein n is a rational number of from 1.5 to 2.5.

8. A construction material according to claim 1 wherein in the epoxy resin composition the components (a) epoxy compound and (b) ester of a mercaptoalkylcarboxylic acid are mixed at a ratio such that the epoxy equivalent weight number of component (a) to the theoretical active hydrogen equivalent weight number of component (b) is in the range of from 0.5 to 2, and the amount of (c) tertiary amine-type curing accelerator is up to 15 percent based on the total weight of the epoxy resin composition.

9. A construction material according to claim 1 wherein in the epoxy resin composition the components (a) epoxy compound and (b) ester of a mercaptoalkylcarboxylic acid are mixed at a ratio such that the epoxy equivalent weight number of component (a) to the theoretical active hydrogen equivalent weight number of component (b) is in the range of from 0.8 to 1.2, and the amount of (c) tertiary amine-type curing accelerator is from 1 to 10 percent based on the total weight of the epoxy resin composition.

10. A construction material according to claim 1 which comprises from 1 to 50 percent by weight of the epoxy resin composition.

11. A construction material according to claim 1 which comprises from about 3 to 25 percent by weight of the epoxy resin composition.

12. The construction material according to claim 1 wherein the mercaptoalkylcarboxylic acid ester (b) is a trimethylolpropane-mercaptopropionic acid ester, a trimethylolpropane-mercaptopropionic acid-thioglycollic acid ester, a pentarerythritol-ethylene glycol-mercaptopropionic acid ester, or a trimethylolpropane-propylene glycol-mercaptopropionic acid-thioglycollic acid ester.

13. A construction material according to claim 12 which comprises about 7.5 percent of the epoxy resin composition as a binder and about 92.5 percent of an aggregate mixture of said coarse aggreates (d) and fine aggregates (e) at a weight ratio of (d): (e) of about 7:3.

14. A construction material according to claim 1 which comprises a mixture of about 100 parts by weight of the epoxy resin composition as a binder and about 100 parts of natural sand having a particle diameter of less than 2.5 mm.

15. A construction material according to claim 1 which comprises about 25 parts of the epoxy resin composition as a binder and about 75 parts by weight of natural sand having a particle diameter of less than 2.5 mm.

16. A construction material according to claim 1 which comprises about 3 parts by weight of the epoxy resin composition as a binder and about 97 parts of natural aggregates having a particle diameter of from 13 to 5 mm.

* * * * *